United States Patent
Chen et al.

(10) Patent No.: US 9,730,209 B2
(45) Date of Patent: Aug. 8, 2017

(54) COMMUNICATION TERMINAL DEVICE, BASE STATION DEVICE, AND COMMUNICATION SYSTEM

(71) Applicant: FUJITSU LIMITED, Kawasaki-shi, Kanagawa (JP)

(72) Inventors: Hongyang Chen, Kawasaki (JP); Yoshinori Tanaka, Yokohama (JP); Daisuke Jitsukawa, Adachi (JP); Michiharu Nakamura, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 104 days.

(21) Appl. No.: 14/863,700

(22) Filed: Sep. 24, 2015

(65) Prior Publication Data
US 2016/0014747 A1    Jan. 14, 2016

Related U.S. Application Data

(63) Continuation of application No. PCT/JP2013/060377, filed on Apr. 4, 2013.

(51) Int. Cl.
*H04W 4/00* (2009.01)
*H04W 72/04* (2009.01)
(Continued)

(52) U.S. Cl.
CPC ............. *H04W 72/042* (2013.01); *H04L 1/18* (2013.01); *H04L 5/0007* (2013.01);
(Continued)

(58) Field of Classification Search
CPC . H04W 72/042; H04W 72/048; H04W 4/005; H04W 72/1289; H04L 5/0007; H04L 1/18
See application file for complete search history.

(56) References Cited

U.S. PATENT DOCUMENTS

2013/0028199 A1*  1/2013  Song ................... H04W 16/12
                                                            370/329
2013/0230013 A1   9/2013  Seo et al.
2015/0319718 A1* 11/2015  Yang ................... H04W 28/18
                                                            370/252

FOREIGN PATENT DOCUMENTS

WO    2012/070914 A2   5/2012
WO    2013/015627 A2   1/2013

OTHER PUBLICATIONS

Extended European search report with the supplementary European search report and the European search opinion issued for corresponding European Patent Application No. 13880884.5 issued on Feb. 17, 2016.
(Continued)

*Primary Examiner* — Afshawn Towfighi
(74) *Attorney, Agent, or Firm* — Myers Wolin, LLC

(57) ABSTRACT

A communication terminal device includes a determining unit that determines a region size of a control channel in accordance with a PHICH duration value transmitted from a base station device, and an acquiring unit that acquires, on the basis of the region size, data to be sent to the communication terminal device. A base station device includes a first control unit that updates a CFI value at a first interval, a second control unit that updates a PHICH duration value at a second interval, the second interval being greater than the first interval, and a scheduling unit that performs scheduling of, only in a subframe in which the PHICH duration value matches the CFI value, data to be sent to a communication terminal device that is outside an arrival coverage of a signal including the CFI value.

5 Claims, 6 Drawing Sheets

(51) Int. Cl.
  *H04L 1/18* (2006.01)
  *H04W 72/12* (2009.01)
  *H04L 5/00* (2006.01)
(52) U.S. Cl.
  CPC ......... *H04W 4/005* (2013.01); *H04W 72/048* (2013.01); *H04W 72/1289* (2013.01)

(56) References Cited

OTHER PUBLICATIONS

NTT DOCOMO, "PCFICH Protection by Indicating MBSFN Subframe Configuration in Handover Command", Agenda Item: 7.5.2, R2-110114, 3GPP TSG RAN WG2 Meeting #72bis, 3rd Generation Partnership Project (3GPP), Dublin, Ireland, Jan. 17-21, 2011.
Notice of Preliminary Rejection issued for corresponding Korean Patent Application No. 10-2015-7027205 mailed on Mar. 21, 2016 with an English translation.
International Search Report with Written Opinion of the International Searching Authority for corresponding International Patent Application No. PCT/JP2013/060377, mailed on Jul. 9, 2013, with an English translation.
Alcatel-Lucent et al., "Feasibility of coverage extension of physical channels for MTC devices", Agenda Item: 7.3.4, 3GPP TSG-RAN WG1 Meeting #72, R1-130462, St Julian's, Malta, Jan. 28-Feb. 1, 2013.
Motorola, Change Request for "Introduction of Rel-10 LTE-Advanced features in 36.213", 3GPP TSG-RAN Meeting #63, R1-106557, Jacksonville, USA, Nov. 15-19, 2010.
Huawei et al, "Analysis of PCFICH performance issue and possible solutions", Agenda Item: 6.8.1, 3GPP TSG-RAN WG1 Meeting #63, R1-106166, Jacksonville, USA, Nov. 15-19, 2010.
Qualcomm Incorporated, "Techniques to help optimizing the CRE gains", Agenda Item: 6.8.1.2, 3GPP TSG-RAN WG1 Meeting #63, R1-106383, Jacksonville, USA, Nov. 15-19, 2010.
Office Action issued by the Japan Patent Office for corresponding Japanese Patent Application No. 2015-509814, mailed on Dec. 20, 2016, with a partial English translation.
Decision of Refusal issued by the Japan Patent Office for corresponding Japanese Patent Application No. 2015-509814, mailed on Mar. 14, 2017, with an English translation.

\* cited by examiner

FIG.5

| SUBFRAME NUMBER | #0 | #1 | #2 | #3 | | #40 | #41 | #42 | #43 | |
|---|---|---|---|---|---|---|---|---|---|---|
| CCH REGION SIZE | 3 | 2 | 3 | 3 | | 2 | 1 | 2 | 1 | |
| CFI | 3 | 2 | 3 | 3 | ⋯ | 2 | 1 | 2 | 1 | ⋯ |
| PHICH DURATION | 3 | 3 | 3 | 3 | | 1 | 1 | 1 | 1 | |
| SCHEDULE TERMINAL A | YES | NO | YES | YES | | NO | YES | NO | YES | |

←—— 40 ms ——→←—— 40 ms ——→

———————————→ TIME

COMMUNICATION TERMINAL DEVICE, BASE STATION DEVICE, AND COMMUNICATION SYSTEM

CROSS-REFERENCE TO RELATED APPLICATION

This application is a continuation of International Application No. PCT/JP2013/060377 filed on Apr. 4, 2013, the entire contents of which are incorporated herein by reference.

FIELD

The embodiments discussed herein are related to a communication terminal device, a base station device, and a communication system.

BACKGROUND

A new terminal, known as a Machine Type Communication (MTC) terminal and which is used in a communication system that includes a base station device (hereinafter, sometimes simply referred to as "base station") and a communication terminal device (hereinafter, sometimes simply referred to as "terminal") has recently been receiving attention. Examples of MTC terminals include smart meters, which are electrical power meters that include a wireless communication function, and vending machines that have a wireless communication function. Smart meters that include a wireless communication function transmit data on, for example, the measured electrical power usage to a base station. Vending machines that have a wireless communication function transmits, to a base station, sales information, inventory information, and the like.

Unlike mobile terminals, such as mobile phones carried by users, MTC terminals are less likely to be moved; therefore, it is not desired that the MTC terminals include a communication function that can adaptively cope with changes in the communication environment. Furthermore, when compared with a mobile terminal, an MTC terminal uses fewer types of data and a lower volume of communication data for communication. Consequently, when compared with mobile terminals, the low installation costs and communication costs of the MTC terminals are desirable.

For MTC terminals, which have the desirable above-described cost reductions, there is a conventional technology that does not need a Control Format Indicator (CFI) notification to be sent from a base station to an MTC terminal because with this technology a CFI that indicates the region size of a control channel (CCH) has a fixed value. By using a CFI with a fixed value, the MTC terminals do not need to include the function of receiving a CFI and thus there is no need to transmit the CFI from the base station; therefore, it is possible to reduce the needed installation and communication costs of the terminals.

Related-art examples are described, for example, in 3GPP TSG-RAN WG1 Meeting #72, R1-130462, St Julian's, Malta, 28 Jan.-1 Feb. 2013.

However, base stations also communicate with mobile terminals in addition to communicating with MTC terminals. Consequently, in accordance with the movement of the mobile terminals, the number of terminals accommodated by a single base station (hereinafter, sometimes referred to as the "accommodated terminal count") continuously varies. Furthermore, in a CCH region, because control data, such as scheduling information, with respect to each terminal is transmitted, the needed CCH region size increases as the accommodated terminal count increases. Consequently, if the CCH region size, i.e., the CFI value, is small and fixed, there may be some terminals that are notified of scheduling information, and some terminals that are not notified of scheduling information when the accommodated terminal count becomes large. Accordingly, in order to prevent the occurrence of terminals that are notified of scheduling information and terminals that are not notified of scheduling information, it is conceivable to use a CCH region size, i.e., the CFI value, such that the CCH region size is large and fixed. However, if the CCH region size is large and fixed, some CCH region is wasted and the efficiency with which a CCH is used in the resource decreases when the accommodated terminal count becomes low.

SUMMARY

According to an aspect of an embodiment, a communication terminal device includes a determining unit that determines a region size of a control channel in accordance with a PHICH duration value transmitted from a base station device, and
an acquiring unit that acquires, on the basis of the region size, data to be sent to the communication terminal device.

According to another aspect of an embodiment, a base station device includes a first control unit that updates a CFI value at a first interval, a second control unit that updates a PHICH duration value at a second interval, the second interval being greater than the first interval, and a scheduling unit that performs scheduling of, only in a subframe in which the PHICH duration value matches the CFI value, data to be sent to a communication terminal device that is outside an arrival coverage of a signal including the CFI value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a schematic diagram illustrating the operation of a process performed by the communication system according to the first embodiment.

DESCRIPTION OF EMBODIMENTS

Figure 1:
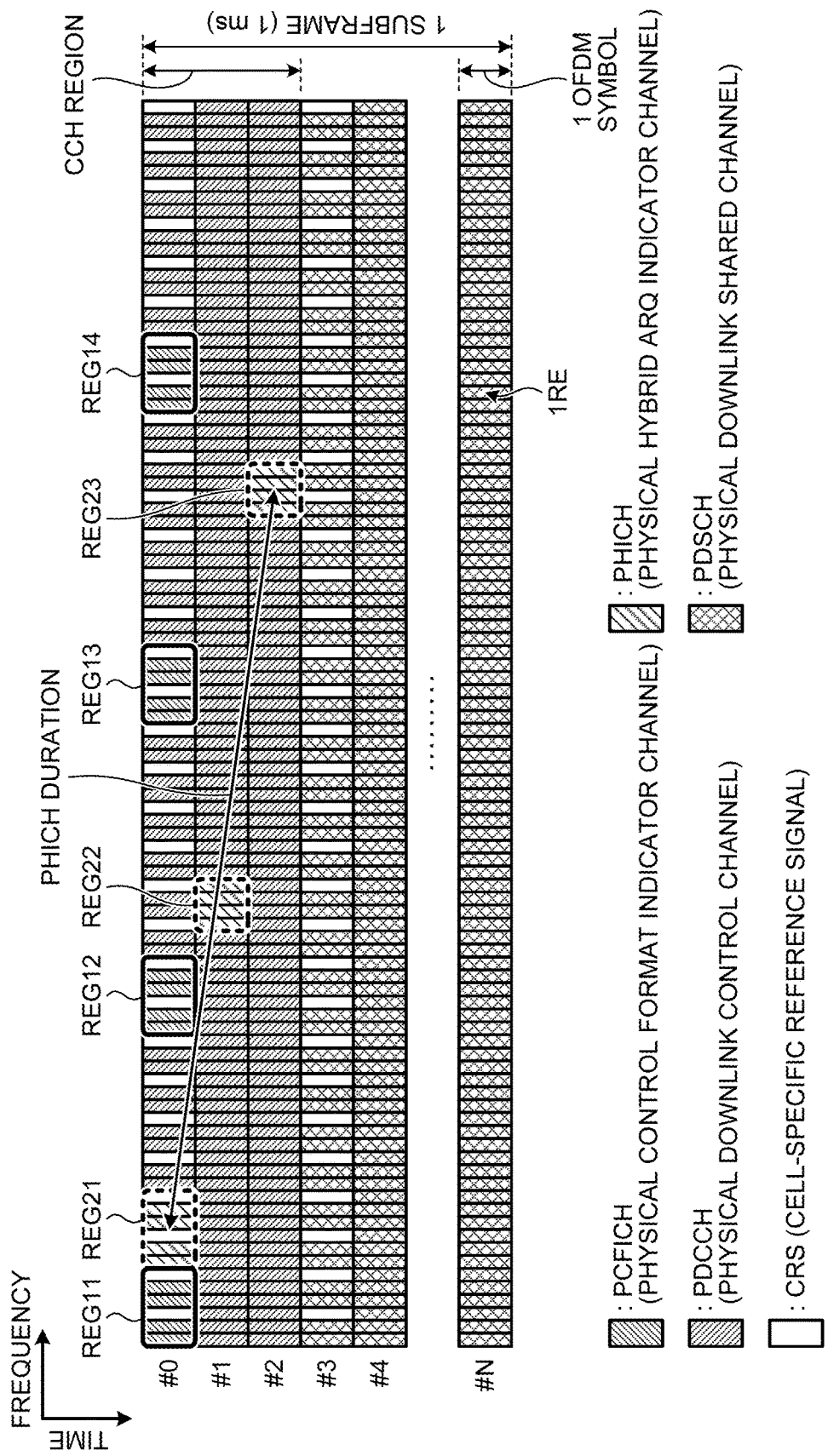
FIG. 1 is a schematic diagram illustrating an example of the mapping of a physical channel according to a first embodiment.

Preferred embodiments of a terminal, a base station, and a communication system disclosed in the present invention will be described in detail below with reference to the accompanying drawings. The terminal, the base station, and the communication system disclosed in the present invention are not limited to the embodiments. Furthermore, in the embodiments, components having the same function are assigned the same reference numerals; therefore, a description thereof is omitted.

[a] First Embodiment

<Mapping Example of a Physical Channel>

FIG. 1 is a schematic diagram illustrating an example of the mapping of a physical channel according to a first embodiment.

As illustrated in FIG. 1, one subframe with the a duration of 1 ms is formed by N+1 Orthogonal Frequency Division Multiplexing (OFDM) symbols represented by symbols #0 to #N. For example, one subframe is formed by 14 OFDM symbols. Furthermore, one OFDM symbol is formed by multiple subcarriers. A Resource Element (RE), which corresponds to the resource of one subcarrier in one OFDM symbol is defined as the smallest unit of a time/frequency resource. Furthermore, a Resource Element Group (REG) formed by 4 continuous REs in the direction of the frequency except for a Cell-specific Reference Signal (CRS) is defined as the mapping unit of a CCH. Furthermore, one frame with a duration of 10 ms is formed by 10 subframes.

A CCH can be mapped onto a CCH region constituted by a first n OFDM symbols (n=1 to 3) in each subframe. Furthermore, a CRS is mapped onto the top OFDM symbol in each subframe at the same interval in the direction of the frequency. The CCH region size varies over the range of n=1 to 3 in accordance with the accommodated terminal count. Specifically, n increases, such as 1, 2, and 3, as the accommodated terminal count becomes large. The CCH is, for example, a Physical Control Format Indicator Channel (PCFICH), a Physical Hybrid ARQ Indicator Channel (PHICH), and Physical Downlink Control Channel (PDCCH).

Furthermore, a CFI is defined as the CCH region size, i.e., as control information for notifying a terminal of a value of n. The CFI value corresponds to a value of n, and thus CFI=0, 1, 2 correspond to n=1, 2, 3, respectively. Furthermore, because the CCH region size is updated for each subframe in accordance with the accommodated terminal count, the CFI is also updated for each subframe. Consequently, the CFI is transmitted from a base station to a terminal for each subframe. The PCFICH is used for the transmission of the CFI. In the top OFDM symbol in each subframe, four REGs 11, 12, 13, and 14 used for the PCFICH are separately mapped at substantially the same intervals in the direction of the frequency starting from the position of a subcarrier that depends on a cell ID.

The PHICH is a physical channel that is used by the base station to transmit, to a terminal, ACK/NACK information on uplink data sent from the terminal. A total of three REGs 21, 22, and 23 are used for each PHICH group and the number of PHICH groups is determined in accordance with the accommodated terminal count. Specifically, as the accommodated terminal count increases, the number of PHICH groups becomes large. If the accommodated terminal count is low, the number of PHICH groups is also low; therefore, all of the REGs for the PHICH can be mapped onto one OFDM symbol. However, if the accommodated terminal count increases, the number of PHICH groups also becomes large and thus the REGs for the PHICH are mapped onto multiple OFDM symbols. Furthermore, m number of OFDM symbols onto which the PHICH is mapped is 1 or 3 depending on the accommodated terminal count. Specifically, if the accommodated terminal count is low, m is 1 and, if the accommodated terminal count is large, m is 3. The magnitude of m is referred to as a "PHICH duration" and a PHICH duration value is equal to or less than a CFI value. Because the PHICH duration is updated at intervals of 40 ms, i.e., 40 subframes, in accordance with the accommodated terminal count, the PHICH duration value is transmitted from a base station to a terminal at 40-subframe intervals. A Physical Broadcast Channel (PBCH) (not illustrated) is used to transmit the PHICH duration value.

The PBCH is mapped onto a subcarrier at the center frequency of one of the second-half OFDM symbols from among, for example, 14 OFDM symbols constituting the top subframe out of the 10 subframes that constitutes a single frame. Specifically, the transmission of the PBCH signal is repeated at an interval of 10 ms over 40 ms, i.e., repeated four times. Furthermore, the PHICH duration is updated at 40-ms intervals. Consequently, the transmission of the same PHICH duration value is repeated at an interval of 10 ms over 40 ms, i.e., repeated four times.

The PDCCH is a physical channel that is used to notify each terminal of scheduling information of user data that is transmitted by using a Physical Downlink Shared Channel (PDSCH). The PDCCH is mapped, in a CCH region, onto an RE in which the PCFICH, the PHICH, and the CRS are not mapped.

<Example Configuration of the Base Station>

Figure 2:
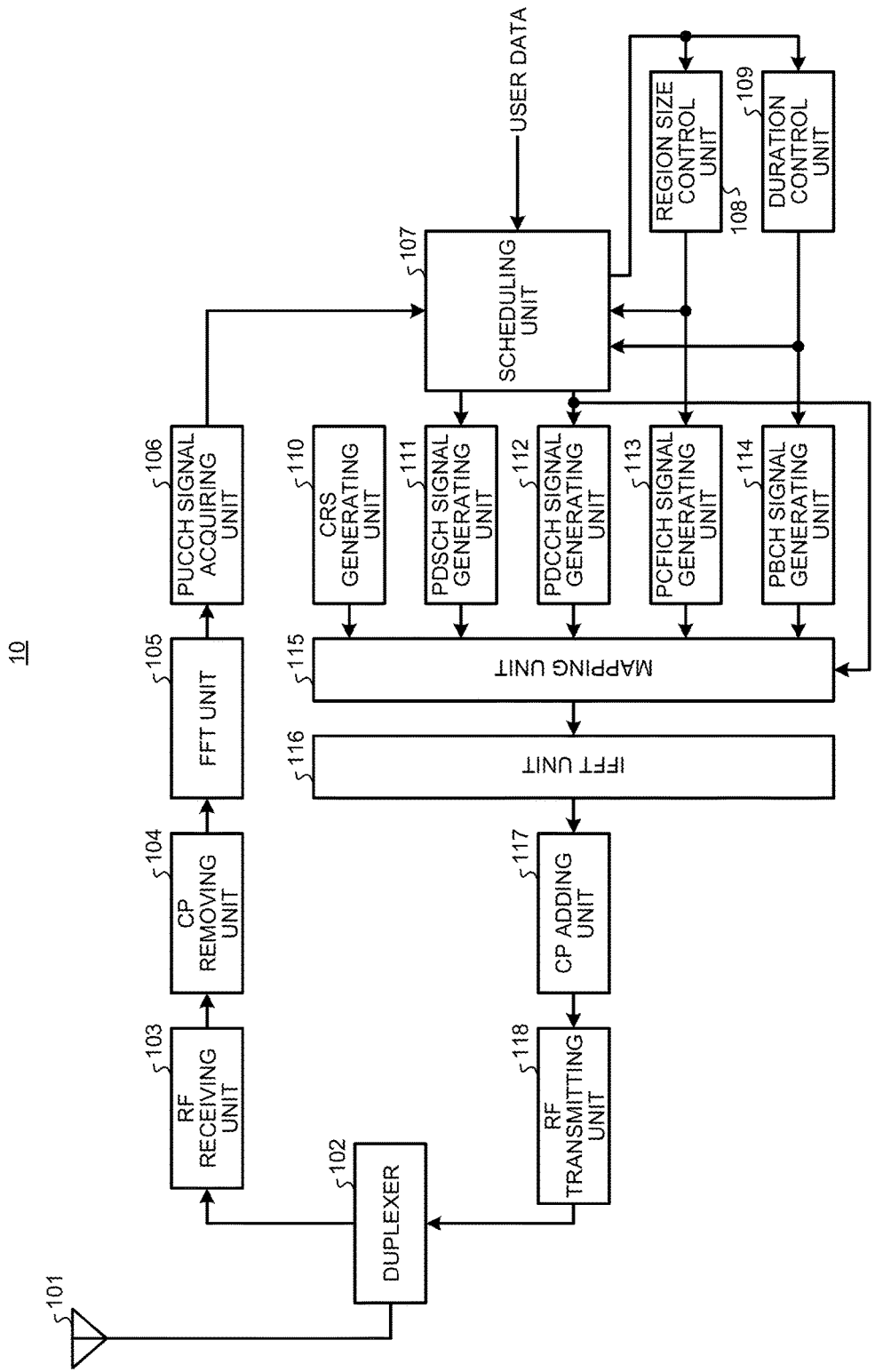
FIG. 2 is a functional block diagram illustrating the main configuration of a base station according to the first embodiment.

FIG. 2 is a functional block diagram illustrating the main configuration of a base station according to the first embodiment. In FIG. 2, a base station 10 includes an antenna 101, a duplexer 102, and a Radio Frequency (RF) receiving unit 103. Furthermore, the base station 10 includes a Cyclic Prefix (CP) removing unit 104, a Fast Fourier Transform (FFT) unit 105, and a Physical Uplink Control Channel (PUCCH) signal acquiring unit 106. Furthermore, the base station 10 includes a scheduling unit 107, a region size control unit 108, and a duration control unit 109. Furthermore, the base station 10 includes a CRS generating unit 110, a PDSCH signal generating unit 111, a PDCCH signal generating unit 112, a PCFICH signal generating unit 113, and a PBCH signal generating unit 114. Furthermore, the base station 10 includes a mapping unit 115, an Inverse Fast Fourier Transform (IFFT) unit 116, a CP adding unit 117, and an RF transmitting unit 118.

Figure 3:
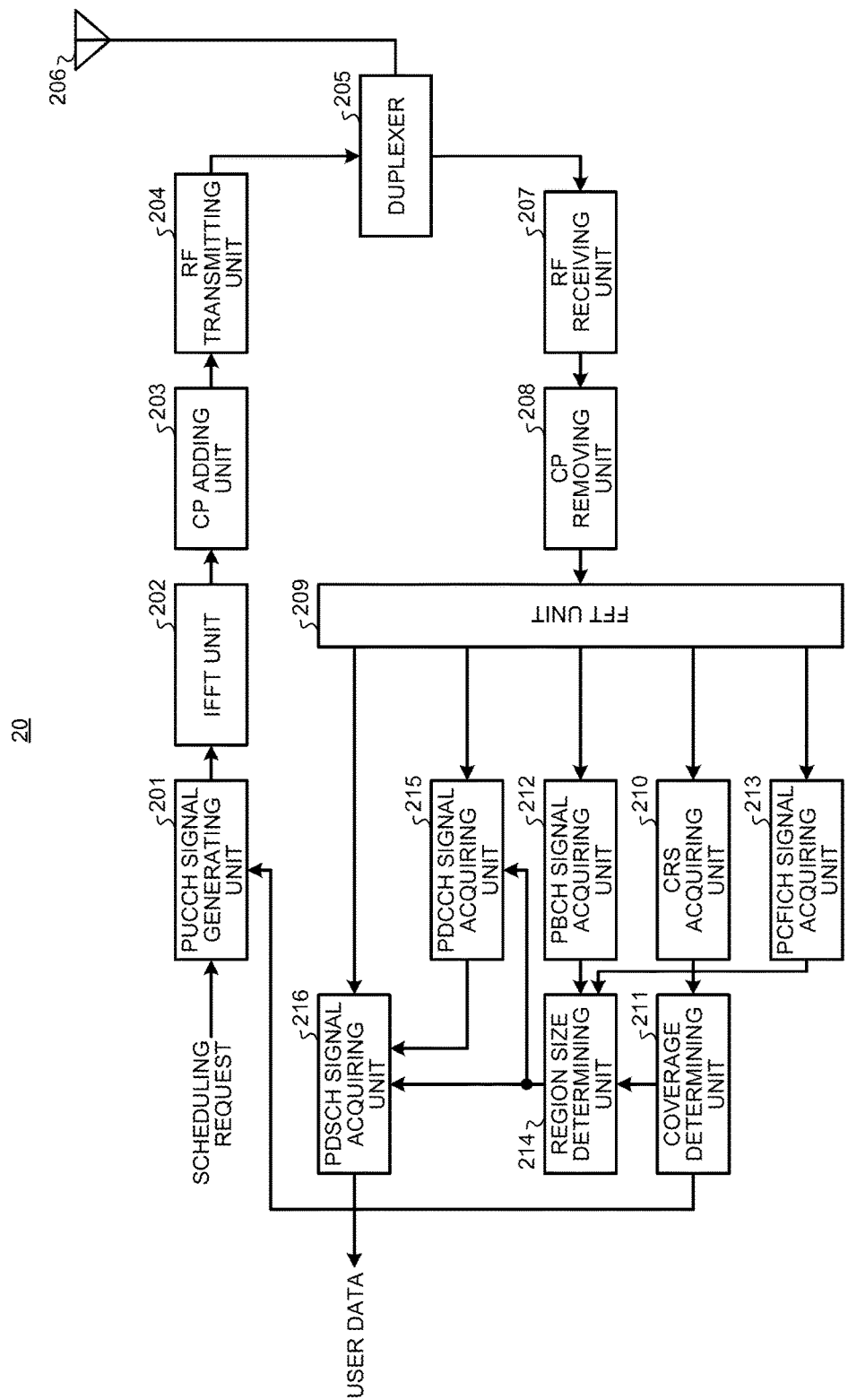
FIG. 3 is a functional block diagram illustrating the main configuration of a terminal according to the first embodiment.

The RF receiving unit 103 receives an OFDM signal transmitted from a terminal 20, which is illustrated in FIG. 3 and will be described later, via the antenna 101 and the duplexer 102; performs, on the OFDM signal, a received radio signal process, such as down-conversion, analog-digital conversion, and the like, to obtain a baseband OFDM signal; and outputs the signal to the CP removing unit 104. A PUCCH signal generated in the terminal 20 is included in the OFDM signal.

In the following, a terminal that is not able to receive a PCFICH signal transmitted from the base station 10 because it is outside an arrival coverage of PCFICH signals may sometimes be referred to as a "poor coverage terminal". In contrast, a terminal that can receive a PCFICH signal transmitted from the base station 10 because it is inside the arrival coverage of a PCFICH signal may sometimes be referred to as a "good coverage terminal". As will be described later, if the terminal 20 is a poor coverage terminal, the terminal 20 transmits, to the base station 10, the terminal ID of the terminal 20 as a "poor coverage terminal ID" by using a PUCCH. Furthermore, as will be described later, if the terminal 20 has uplink data to be sent from itself, i.e., the terminal 20, the terminal 20 transmits a "scheduling request" to the base station 10 by using the PUCCH.

The CP removing unit 104 removes a CP from a baseband OFDM signal to which the CP is added and outputs, to the FFT unit 105, the OFDM signal from which the CP has been removed.

The FFT unit 105 performs an FFT process on the OFDM signal, from which the CP has been removed, to convert the OFDM signal to a frequency domain signal and outputs the frequency domain signal to the PUCCH signal acquiring unit 106.

The PUCCH signal acquiring unit 106 performs a demodulation process and a decoding process on the frequency domain signal and acquires a PUCCH signal from the frequency domain signal. The PUCCH signal acquiring unit 106 outputs, to the scheduling unit 107, a poor coverage terminal ID and a scheduling request both included in the obtained PUCCH signal. Consequently, from among all of the terminals accommodated by the base station 10, the scheduling unit 107 can identify, by using the input poor coverage terminal ID, which terminal is a poor coverage terminal. Furthermore, by accumulating the number of input scheduling requests, the scheduling unit 107 can identify the accommodated terminal count of the base station 10. The scheduling unit 107 outputs the identified accommodated terminal count to both the region size control unit 108 and the duration control unit 109.

The region size control unit 108 controls the CCH region size in accordance with the accommodated terminal count. Specifically, if the accommodated terminal count is less than a first threshold, the region size control unit 108 determines that n is 1. If the accommodated terminal count is equal to or greater than the first threshold and is less than a second threshold, the region size control unit 108 determines that n is 2. If the accommodated terminal count is greater than the second threshold, the region size control unit 108 determines that n is 3. Then, the region size control unit 108 outputs a CFI with a value of n to both the scheduling unit 107 and the PCFICH signal generating unit 113. Furthermore, the region size control unit 108 updates, as described above, a value of n, i.e., a CFI value, for each subframe, i.e., at an interval of 1 ms.

The duration control unit 109 controls the PHICH duration in accordance with the accommodated terminal count. As described above, the PHICH duration value m is 1 or 3. If the accommodated terminal count is less than the second threshold, the duration control unit 109 determines that m is 1; if the accommodated terminal count is equal to or greater than the second threshold, the duration control unit 109 determines that m is 3 for the PHICH duration value. Then, the duration control unit 109 outputs the determined PHICH duration value to the scheduling unit 107 and the PBCH signal generating unit 114. As described above, the duration control unit 109 updates the PHICH duration value at intervals of 40 subframes, i.e., at an interval of 40 ms.

The scheduling unit 107 performs scheduling of the input user data such that it is determined which user data of a terminal is allocated to which RE; outputs the user data to the PDSCH signal generating unit 111; and outputs the result of the scheduling to both the PDCCH signal generating unit 112 and the mapping unit 115.

At this point, the scheduling unit 107 performs scheduling of the user data in accordance with the poor coverage terminal ID that is input from the PUCCH signal acquiring unit 106, the CFI that is input from the region size control unit 108, and a PHICH duration value that is input from the duration control unit 109. Specifically, the scheduling unit 107 performs scheduling of the user data that is to be sent to the poor coverage terminal indicated by the poor coverage terminal ID by using only a subframe in which the PHICH duration value matches the CFI value. In contrast, the scheduling unit 107 performs scheduling of, for each subframe, the user data that is to be sent to a terminal that is not indicated by the poor coverage terminal ID, i.e., a terminal other than the poor coverage terminal. Furthermore, on the basis of the CFI that is input from the region size control unit 108, the scheduling unit 107 performs scheduling of the user data by using the OFDM symbol, which is subsequent in the time direction in a CCH region, as a starting point. For example, in FIG. 1, if the CFI is 1, n is 1; therefore, the scheduling unit 107 performs scheduling of the user data by using the OFDM symbol #1 as the starting point.

The CRS generating unit 110 generates a CRS and outputs the CRS to the mapping unit 115.

The PDSCH signal generating unit 111 performs an encoding process and a modulation process on user data that is input from the scheduling unit 107 to generate a PDSCH signal and then outputs the PDSCH signal to the mapping unit 115.

The PDCCH signal generating unit 112 performs the encoding process and the modulation process on the result of scheduling that is input from the scheduling unit 107 to generate a PDCCH signal and then outputs the PDCCH signal to the mapping unit 115.

The PCFICH signal generating unit 113 performs the encoding process and the modulation process on the CFI that is input from the region size control unit 108 to generate a PCFICH signal and then outputs the PCFICH signal to the mapping unit 115.

The PBCH signal generating unit 114 performs the encoding process and the modulation process on the PHICH duration value that is input from the duration control unit 109 to generate a PBCH signal and then outputs the PBCH signal to the mapping unit 115.

The mapping unit 115 maps, in accordance with the result of the mapping described in the above example and in accordance with the result of the scheduling, the signal in each physical channel onto an RE and then outputs the signal to the IFFT unit 116.

The IFFT unit 116 performs an IFFT process on the signal that is input from the mapping unit 115 to generate an OFDM signal and then outputs the OFDM signal to the CP adding unit 117.

The CP adding unit 117 adds a CP to the OFDM signal and outputs, to the RF transmitting unit 118, the OFDM signal to which the CP is added.

The RF transmitting unit 118 performs a wireless transmission process, i.e., digital-to-analog conversion, up-conversion, or the like, on the baseband OFDM signal to obtain a radio signal and then transmits the radio signal to the terminal 20 via the duplexer 102 and the antenna 101.

<Example Configuration of the Terminal>

FIG. 3 is a functional block diagram illustrating the main configuration of a terminal according to the first embodiment. The terminal 20 illustrated in FIG. 3 is, for example, an MTC terminal. In FIG. 3, the terminal 20 includes a PUCCH signal generating unit 201, an IFFT unit 202, a CP adding unit 203, an RF transmitting unit 204, a duplexer 205, and an antenna 206. Furthermore, the terminal 20 includes an RF receiving unit 207, a CP removing unit 208, an FFT unit 209, a CRS acquiring unit 210, a coverage determining unit 211, and a region size determining unit 214. Furthermore, the terminal 20 includes a PBCH signal acquiring unit 212, a PCFICH signal acquiring unit 213, a PDCCH signal acquiring unit 215, and a PDSCH signal acquiring unit 216.

The PUCCH signal generating unit 201 receives an input of a scheduling request and a poor coverage terminal ID. The PUCCH signal generating unit 201 performs an encoding process and a modulation process on the scheduling request and the poor coverage terminal ID to generate a PUCCH signal and then outputs the PUCCH signal to the IFFT unit 202.

The IFFT unit 202 performs an IFFT process on the PUCCH signal to generate an OFDM signal and then outputs the OFDM signal to the CP adding unit 203.

The CP adding unit 203 adds a CP to the OFDM signal and outputs, to the RF transmitting unit 204, the OFDM signal to which the CP has been added.

The RF transmitting unit 204 performs a wireless transmission process on a baseband OFDM signal, i.e., digital-to-analog conversion, up-conversion, or the like, to obtain a radio signal and then transmits the radio signal to the base station 10 via the duplexer 205 and the antenna 206.

The RF receiving unit 207 receives, via the antenna 206 and the duplexer 205, the OFDM signal transmitted from the base station 10; performs the received radio signal process, i.e., down-conversion, analog-digital conversion, or the like, on the OFDM signal to obtain a baseband OFDM signal; and outputs the signal to the CP removing unit 208.

The CP removing unit 208 removes the CP from the baseband OFDM signal to which the CP has been added and outputs, to the FFT unit 209, the OFDM signal from which the CP has been removed.

The FFT unit 209 performs an FFT process on the OFDM signal from which the CP has been removed to convert the OFDM signal to the frequency domain signal and then outputs the frequency domain signal to the CRS acquiring unit 210, the PBCH signal acquiring unit 212, the PCFICH signal acquiring unit 213, the PDCCH signal acquiring unit 215, and the PDSCH signal acquiring unit 216.

The CRS acquiring unit 210 acquires, on the basis of the example of the mapping described above, a CRS from the frequency domain signal and outputs the signal to the coverage determining unit 211.

The coverage determining unit 211 measures the received power of the CRS and compares the measurement results with a threshold. If the CRS received power is less than the threshold, the coverage determining unit 211 determines that the PCFICH signal is not be able to be received because the reception coverage is too small. Specifically, if the CRS received power is less than the threshold, the coverage determining unit 211 determines that the terminal 20 is a poor coverage terminal and outputs the terminal ID of the terminal 20 as a poor coverage terminal ID to the PUCCH signal generating unit 201. In contrast, if the CRS received power is greater than the threshold, the coverage determining unit 211 determines that the reception coverage of the terminal 20 is large and thus can receive the PCFICH signal. Consequently, if the CRS received power is greater than the threshold, the coverage determining unit 211 determines that the terminal 20 is a good coverage terminal and thus does not output a poor coverage terminal ID to the PUCCH signal generating unit 201. Furthermore, the coverage determining unit 211 outputs, to the region size determining unit 214, a notification signal (hereinafter, sometimes be referred to as a "coverage notification signal") indicating whether the terminal 20 is a poor coverage terminal or a good coverage terminal.

The PBCH signal acquiring unit 212 performs the demodulation process and the decoding process on the PBCH signal extracted from the frequency domain signal on the basis of the example of the above-described mapping to acquire a PBCH signal and then outputs the PHICH duration value included in the PBCH signal to the region size determining unit 214.

The PCFICH signal acquiring unit 213 performs the demodulation process and the decoding process on the PCFICH signal extracted from the frequency domain signal on the basis of the example of the mapping described above to acquire a PCFICH signal and outputs the CFI included in the PCFICH signal to the region size determining unit 214.

The region size determining unit 214 switches parameters, between the PHICH duration value and the CFI value, that are used to determine the CCH region size in accordance with the coverage notification signal. Specifically, if the terminal 20 is a poor coverage terminal, the region size determining unit 214 determines the CCH region size in accordance with the PHICH duration value without using the CFI value. More specifically, if the terminal 20 is a poor coverage terminal, the region size determining unit 214 determines that the PHICH duration value indicates the CCH region size. In contrast, if the terminal 20 is a good coverage terminal, the region size determining unit 214 determines the CCH region size in accordance with the CFI. Specifically, if the terminal 20 is a good coverage terminal, the region size determining unit 214 recognizes that the CFI value indicates the CCH region size. The region size determining unit 214 outputs the CCH region size recognized in this way to both the PDCCH signal acquiring unit 215 and the PDSCH signal acquiring unit 216.

The PDCCH signal acquiring unit 215 extracts a PDCCH signal from the frequency domain signal on the basis of the CCH region size recognized by the region size determining unit 214. The PDCCH signal acquiring unit 215 performs the demodulation process and the decoding process on the extracted PDCCH signal to acquire the PDCCH signal and then outputs the scheduling information included in the PDCCH signal to the PDSCH signal acquiring unit 216.

The PDSCH signal acquiring unit 216 extracts, from the frequency domain signal, a PDSCH signal to be sent to the terminal 20 on the basis of the CCH region size that is recognized by the region size determining unit 214 and on the basis of the scheduling information that is input from the PDCCH signal acquiring unit 215. The PDSCH signal acquiring unit 216 performs the demodulation process and the decoding process on the extracted PDSCH signal to acquire user data to be sent to the terminal 20.

<Processing Sequence of the Communication System>

Figure 4:
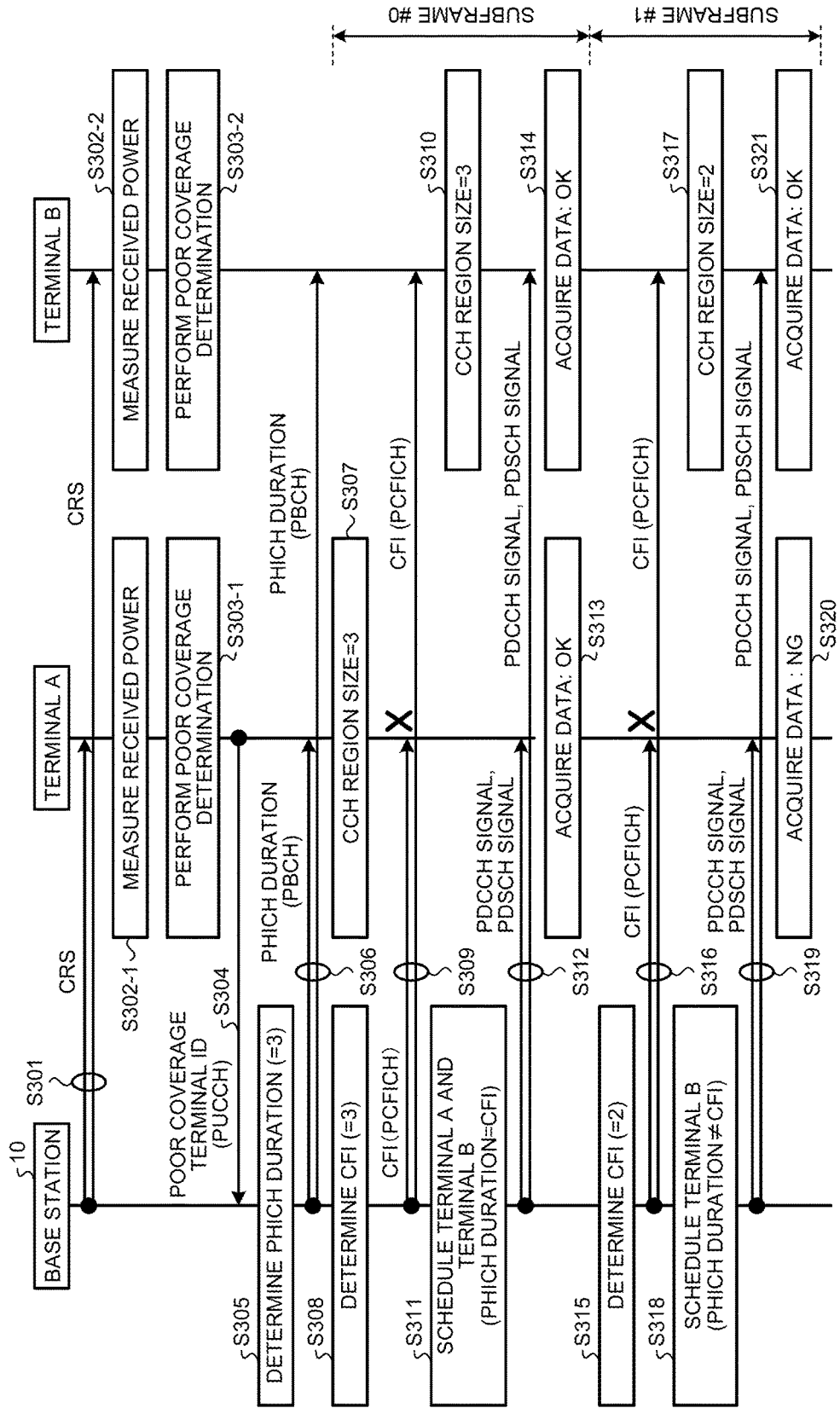
FIG. 4 is a schematic diagram illustrating an example of a processing sequence performed by a communication system according to the first embodiment.

FIG. 4 is a schematic diagram illustrating an example of a processing sequence performed by a communication system according to the first embodiment. A terminal A and a terminal B illustrated in FIG. 4 correspond to the terminal 20 illustrated in FIG. 3.

The base station 10 transmits a CRS to the terminal A and the terminal B in the subframe #0 or a frame before the subframe #0 (Step S301).

The terminal A and the terminal B measure the received power of the CRS (Steps S302-1 and S302-2) to determine whether they are themselves a poor coverage terminal or a good coverage terminal (poor coverage determination: Steps S303-1 and S303-2). At this point, it is assumed that the terminal A determines that the CRS received power at the terminal A is less than the threshold and thus determines that the terminal A is a poor coverage terminal. Consequently, the terminal A notifies the base station 10 of the terminal ID of the terminal A as a poor coverage terminal ID by using the PUCCH (Step S304). In contrast, it is assumed that the terminal B determines that the CRS received power of the terminal B is greater than the threshold and thus determines that the terminal B is a good coverage terminal. Consequently, the terminal B does not send a poor coverage terminal ID as a notification to the base station 10.

At this point, both the terminal A and the terminal B preferably perform the poor coverage determination at Steps S303-1 and S303-2 at an interval of 40 ms in accordance with an update interval of the PHICH duration. In this manner, the base station 10 can set the PHICH duration according to a change of the poor coverage determination, and each terminal can switch to a mode in which the terminal refers to the PHICH duration to grasp the CFI.

Alternatively, a condition may be set, in which "a mode in which a terminal refers to the PHICH duration to grasp the CFI, is switched to in a subframe that comes in a certain period of time after the subframe in which the terminal has transmitted its poor coverage terminal ID by using the PUCCH". In this manner, the base station 10 can transmit the PDCCH signal and the PDSCH signal to each terminal after the terminal has surely switched to the mode in which the terminal refers to the PHICH duration to grasp the CFI.

As another method different from the above-described method, there is a method in which the base station 10 determines whether each terminal is a poor coverage terminal or a good coverage terminal. For example, as described later, the terminal A having a poor coverage can receive the PDSCH signal without problem by the functions of the Link adaptation that controls the Modulation and Coding Scheme (MCS) and the Hybrid ARQ that is a retransmission control. These functions are set such that, in general, the block error rate for the initial transmission remains a certain rate (e.g., 10%) and reception succeeds by up to two transmissions. However, if it is difficult for the terminal to decode the PCFICH signal, it is difficult for the terminal to recognize an erroneous CCH region size and to receive the PDCCH signal. In addition, if the PDSCH signal is repeatedly retransmitted and the number of retransmissions reaches a preset maximum value, it is difficult for the terminal to receive the PDSCH signal. Thus, the base station 10 can determine a terminal to be a poor coverage terminal when the base station 10 does not receive an ACK signal from the terminal for a preset number of retransmissions of the PDSCH signal. If the base station 10 determines the terminal to be a poor coverage terminal, the base station 10 transmits the terminal's poor coverage terminal ID by including it in a broadcast channel or the PBCH signal. If the terminal ID of a terminal is included in a broadcast channel or the PBCH signal as a poor coverage terminal ID, the terminal switches to the mode in which the terminal refers to the PHICH duration to grasp the CFI.

Referring back to the description of FIG. 4, the base station 10 determines the duration of the PHICH in accordance with the accommodated terminal count (Step S305). In this example, it is assumed that the accommodated terminal count is equal to or greater than a second threshold. Consequently, the base station 10 determines that the PHICH duration value is "3". The base station 10 notifies the terminal A and the terminal B that the "PHICH duration value is 3" by using the PBCH signal (Step S306). At this point, as described above, because the transmission of the PBCH signal is repeated at an interval of 10 ms over 40 ms, i.e., repeated four times, the terminal A and the terminal B combine the PBCH signals transmitted four times, thereby increasing the reception coverage of the PBCH signal. Consequently, the terminal A and the terminal B can reliably acquire the PHICH duration value.

Alternatively, the conventional specification that repeats the transmission of the PBCH signal used for the transmission of the PHICH duration at an interval of 10 ms over 40 ms, i.e., repeats four times, may not be used. Specifically, the number of repeated transmissions may be increased, power boost may be performed, stronger encoding may be performed, or the above methods may be combined to enhance the PBCH signal and the enhanced PBCH signal may be used. This manner further ensures the delivery of the PHICH duration value to a poor coverage terminal.

Because the terminal A is a poor coverage terminal, the terminal A recognizes the CCH region size from the PHICH duration value included in the PBCH signal transmitted in the subframe #0 or a frame before the subframe #0 instead of recognizing the CCH region size from the CFI. Specifically, the terminal A recognizes that the CCH region size is "3" in the subframe #0 (Step S307).

The base station 10 determines, in the subframe #0, the CFI in accordance with the accommodated terminal count (Step S308). Because the accommodated terminal count is equal to or greater than a second threshold, the base station 10 determines that the CFI value is "3". The base station 10 transmits the "CFI is 3" by using the PCFICH (Step S309). At this point, the terminal A is a poor coverage terminal, whereas the terminal B is a good coverage terminal. Consequently, the terminal A is not able to receive the PCFICH signal, whereas the terminal B does receive the PCFICH signal. Furthermore, because the terminal B is a good coverage terminal, the terminal B recognizes the CCH region size from the CFI. Specifically, the terminal B recognizes that the CCH region size is "3" in the subframe #0 (Step S310).

Because both the PHICH duration determined at Step S305 and the CFI determined at Step S308 are "3", i.e., they match, the base station 10 performs scheduling of, in the subframe #0 where the PHICH duration matches the CFI, the user data to be sent to the terminal A. Furthermore, the base station 10 performs scheduling of, in the subframe #0, the user data to be sent to the terminal B regardless of whether both the PHICH duration and the CFI match (Step S311).

The base station 10 transmits the PDCCH signal and the PDSCH signal in the subframe #0 to the terminal A and the terminal B (Step S312).

In the subframe #0, both the PHICH duration and the CFI match are "3", i.e., they match. Consequently, in the subframe #0, because the CCH region size recognized by the terminal A from the PHICH duration value matches the CFI determined by the base station 10, the terminal #A can acquire, from the PDCCH signal and the PDSCH signal, the user data to be sent to itself, i.e., sent to the terminal #A (Step S313). Furthermore, in the subframe #0, because the CCH region size recognized by the terminal B from the CFI matches the CFI determined by the base station 10, the terminal #B also can acquire, from the PDCCH signal and the PDSCH signal, the user data to be sent to itself, i.e., sent to the terminal #B (Step S314).

In the subframe #1, it is assumed that the accommodated terminal count decreases compared with the subframe #0 and thus the accommodated terminal count becomes equal to or greater than the first threshold and becomes less than the second threshold. Furthermore, because the PHICH duration is updated at an interval of 40 ms, the PHICH duration value remains the same, i.e., "3", in the subframe #1.

In the subframe #1, the base station 10 determines the CFI in accordance with the accommodated terminal count (Step S315). Because the accommodated terminal count is equal to or greater than the first threshold and is less than the second threshold, the base station 10 determines that the CFI value is "2". The base station 10 transmits the "CFI is 2" by using the PCFICH (Step S316). As the terminal A is a poor coverage terminal, whereas the terminal B is a good coverage terminal, the terminal A is not able to receive the PCFICH signal, whereas the terminal B does receive the PCFICH signal. Furthermore, because the terminal B is a good coverage terminal, the terminal B recognizes the CCH region size from the CFI. Specifically, the terminal B recognizes that the CCH region size of the subframe #1 is "2" (Step S317). In contrast, the terminal A still recognizes that the CCH region size of the subframe #1 is "3", which is the same CCH region size of the subframe #0.

Because the PHICH duration determined at Step S305 does not match the CFI determined at Step S315, the base station 10 does not perform scheduling of the user data to be sent to the terminal A in the subframe #1 in which the PHICH duration and the CFI do not match. Specifically, the user data to be sent to the terminal A is not included in the subframe #1. Furthermore, the base station 10 performs scheduling of the user data to be sent to the terminal B in the subframe #1 regardless of whether both the PHICH duration and the CFI match. Specifically, in a subframe in which both the PHICH duration and the CFI do not match, the scheduling is only performed with respect to the terminal B out of the terminal A and the terminal B (Step S318).

The base station 10 transmits the PDCCH signal and the PDSCH signal obtained in the subframe #1 to the terminal A and the terminal B (Step S319).

In the subframe #1, the PHICH duration still remains "3", which is the same as in the subframe #0, whereas the CFI changes to "2", which means they do not match. Consequently, in the subframe #1, the CCH region size recognized by the terminal A from the PHICH duration value does not match the CFI determined by the base station 10; therefore, the terminal #A fails to demodulate and decode the PDCCH signal and the PDSCH signal (Step S320). However, because the PDCCH signal and the PDSCH signal transmitted from the base station 10 at Step S319 do not include the user data to be sent to the terminal A, no problem occurs even if the terminal A fails to demodulate and decode the PDSCH signal at Step S320. In contrast, in the subframe #1, because the CCH region size recognized by the terminal B from the CFI matches the CFI determined by the base station 10, the terminal #B can acquires the user data to be sent to itself, i.e., sent to the terminal #B, from the PDCCH signal and the PDSCH signal (Step S321).

For the PDCCH signal and the PDSCH signal, if the Link adaptation that controls the MCS and the Hybrid ARQ that is a retransmission control are appropriately performed in accordance with the quality of the radio link, it is possible for the terminal A having a poor coverage to receive the signals without problem.

<Operation of a Process Performed by the Communication System>

FIG. 5 is a schematic diagram illustrating the operation of a process performed by the communication system according to the first embodiment. In the following, a description will be given by focusing on the terminal A, which is a poor coverage terminal.

It is assumed that, in the subframe #0, the base station 10 determines that the PHICH duration value is "3" and that the CFI value is "3". Because the CFI value indicates the CCH region size, the CCH region size at this point is "3". Because the PHICH duration value is updated at 40-ms intervals, the state of the "PHICH duration value=3" does not vary in the subframes #0 to #39. Consequently, because the PHICH duration value matches the CFI value in the subframe #0, the base station 10 performs the scheduling with respect to the terminal A (YES). Furthermore, because the CCH region size recognized by the terminal A from the PHICH duration value matches the CFI value determined by the base station 10 in the subframe #0, the terminal A successfully demodulates and decodes the PDCCH signal and the PDSCH signal.

Furthermore, it is assumed that, in the subframe #1, the base station 10 determines that the CFI value is "2". Accordingly, the CCH region size at this time is "2". Consequently, because the PHICH duration value does not match the CFI value in the subframe #1, the base station 10 does not perform the scheduling with respect to the terminal A (NO). Furthermore, because the CCH region size recognized by the terminal A from the PHICH duration value does not match the CFI value determined by the base station 10 in the subframe #1, the terminal A fails to demodulate and decode the PDCCH signal and the PDSCH signal.

Furthermore, it is assumed that, if the base station 10 determines that the CFI value in the subframe #2 is "3", the CCH region size at this time is "3". Consequently, because the PHICH duration value matches the CFI value in the subframe #2, the base station 10 performs scheduling of the terminal A (YES). Furthermore, because the CCH region size recognized by the terminal A from the PHICH duration value matches the CFI value determined by the base station 10 in the subframe #2, the terminal A successfully demodulates and decodes the PDCCH signal and the PDSCH signal.

The operation of the process performed by the subframe #3 is the same as that performed by the subframe #2.

Furthermore, it is assumed that, if the base station 10 determines that the PHICH duration value is "1" and the CFI value is "2" in a subframe #40, the CCH region size at this point is "2". Because the PHICH duration value is updated at intervals of 40 ms, the state in which the "PHICH duration value is 1" does not vary in the subframe #40 to #79. Consequently, because the PHICH duration value does not match the CFI value in the subframe #40, the base station 10 does not perform scheduling with respect to the terminal A (NO). Furthermore, because the CCH region size recognized by the terminal A from the PHICH duration value does not match the CFI value determined by the base station 10 in the subframe #40, the terminal A fails to demodulate and decode the PDCCH signal and the PDSCH signal.

Furthermore, it is assumed that, in a subframe #41, the base station 10 determines that the CFI value is "1". Accordingly, the CCH region size at this point is "1". Consequently, because the PHICH duration value matches the CFI value in the subframe #41, the base station 10 performs the scheduling with respect to the terminal A (YES). Furthermore, because the CCH region size recognized by the terminal A from the PHICH duration value matches the CFI value determined by the base station 10 in the subframe #41, the terminal A successfully demodulates and decodes the PDCCH signal and the PDSCH signal.

The operation of the process performed by a subframe #42 is the same as that performed by the subframe #40, and the operation of the process performed by a subframe #43 is the same as that performed by the subframe #41.

As described above, according to the embodiment, in the terminal 20, if the terminal 20 is a poor coverage terminal, the region size determining unit 214 determines the CCH region size in accordance with the PHICH duration value transmitted from the base station 10. The PDCCH signal acquiring unit 215 and the PDSCH signal acquiring unit 216 acquire, on the basis of the CCH region size determined by the region size determining unit 214, the data to be sent to the terminal 20.

Furthermore, in the base station 10, the region size control unit 108 updates the CFI value at an interval of 1 ms and the duration control unit 109 updates the PHICH duration value at an interval of 40 ms. The scheduling unit 107 performs scheduling of the data to be sent to a good coverage terminal for each subframe, whereas the scheduling unit 107 performs scheduling of the data to be sent to a poor coverage terminal only in the subframe in which the PHICH duration value matches the CFI value.

As described above, the poor coverage terminal recognizes the CCH region size by substituting the CFI value for the PHICH duration value. Consequently, when the base station notifies the poor coverage terminal of the CCH region size that varies in accordance with the accommodated terminal count, the base station can skip the transmission of the CFI to the poor coverage terminal. Furthermore, even if the CCH dynamically varies in accordance with the accommodated terminal count, the poor coverage terminal can recognize the CCH region size without receiving the PCFICH signal that includes the CFI. Furthermore, the scheduling with respect to the poor coverage terminal is performed only in the subframe in which the PHICH duration value matches the CFI value. Consequently, even if the terminal is a poor coverage terminal that is not able to receive a CFI, it is possible to dynamically vary the CCH region size in accordance with the accommodated terminal count. Consequently, according to the embodiment, the CCH region size does not need to be fixed due to the poor coverage terminal, thus improving the efficiency with which a CCH is used in the resource.

Other Embodiments

Figure 6:
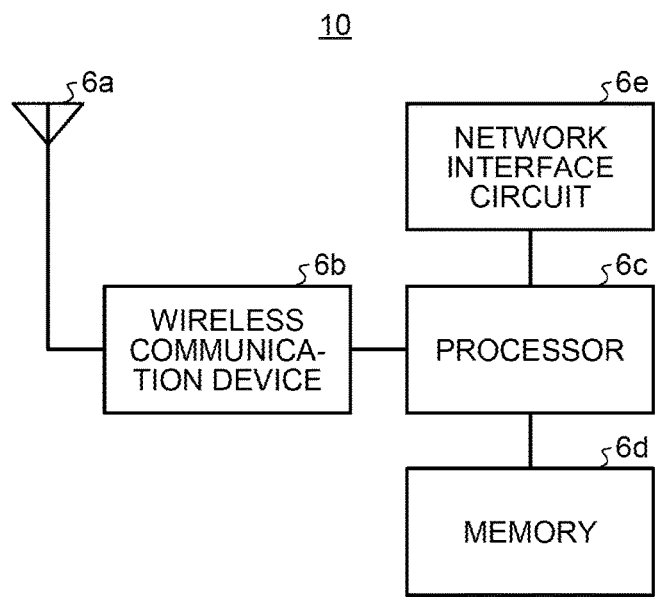
FIG. 6 is a schematic diagram illustrating an example configuration of the hardware of the base station.

[1] The base station 10 described above can be implemented by the hardware configuration described below. FIG. 6 is a schematic diagram illustrating an example configuration of the hardware of the base station. As illustrated in FIG. 6, the base station 10 includes, as components of the hardware configuration, an antenna 6a, a wireless communication device 6b, a processor 6c, a memory 6d, and a network interface circuit 6e. Examples of the processor 6c include a central processing unit (CPU), a digital signal processor (DSP), a field programmable gate array (FPGA). Furthermore, the base station 10 may also include a large scale integrated circuit (LSI) including the processor 6c and peripheral circuits. Examples of the memory 6d include a RAM, a ROM, and a flash memory, such as an SDRAM. The antenna 101 is implemented by the antenna 6a. The duplexer 102, the RF receiving unit 103, and the RF transmitting unit 118 are implemented by the wireless communication device 6b. The CP removing unit 104, the FFT unit 105, the PUCCH signal acquiring unit 106, the scheduling unit 107, the region size control unit 108, the duration control unit 109, the CRS generating unit 110, the PDSCH signal generating unit 111, the PDCCH signal generating unit 112, the PCFICH signal generating unit 113, the PBCH signal generating unit 114, the mapping unit 115, the IFFT unit 116, and the CP adding unit 117 are implemented by the processor 6c.

Figure 7:
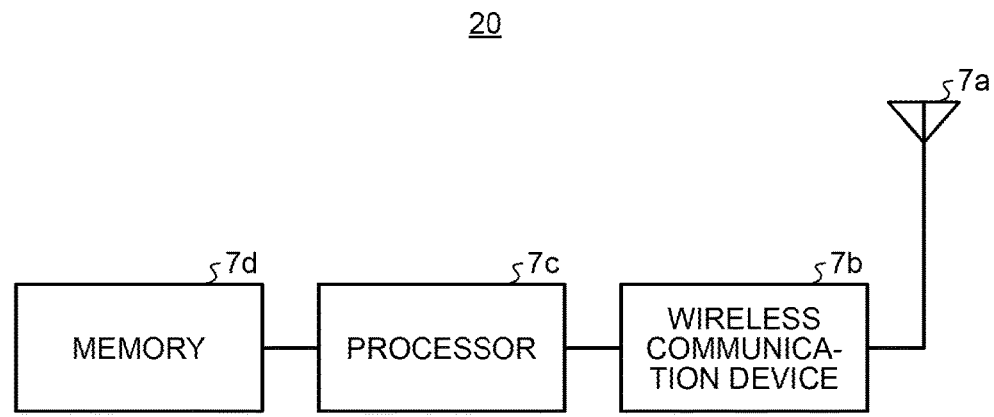
FIG. 7 is a schematic diagram illustrating an example configuration of the hardware of the terminal.

[2] The terminal 20 described above can be implemented by the hardware configuration below. FIG. 7 is a schematic diagram illustrating an example configuration of the hardware of the terminal. As illustrated in FIG. 7, the terminal 20 includes, as components of the hardware configuration, an antenna 7a, a wireless communication device 7b, a processor 7c, and a memory 7d. Examples of the processor 7c include a CPU, a DSP, and a FPGA. Furthermore, the terminal 20 may also includes an LSI that includes the processor 7c and peripheral circuits. Examples of the memory 7d include a RAM, a ROM, and a flash memory, such as an SDRAM. The antenna 206 is implemented by the antenna 7a. The duplexer 205, the RF receiving unit 207, and the RF transmitting unit 204 are implemented by the wireless communication device 7b. The PUCCH signal generating unit 201, the IFFT unit 202, the CP adding unit 203, the CP removing unit 208, the FFT unit 209, the CRS acquiring unit 210, the coverage determining unit 211, the region size determining unit 214, the PBCH signal acquiring unit 212, the PCFICH signal acquiring unit 213, the PDCCH signal acquiring unit 215, and the PDSCH signal acquiring unit 216 are implemented by the processor 7c.

[3] The terminal may also be referred to as "user equipment (UE)". The mobile terminal may also be referred to as a "mobile station (MS)". The base station may also be referred to as an "evolved Node B (eNB)", a "base station (BS)", or a "base transceiver station (BTS)".

According to the aspect of the disclosed embodiment, an advantage is provided in that the efficiency with which a CCH is used in the resource can be improved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication terminal device comprising:
a determining unit that determines a region size of a control channel in accordance with a Physical Hybrid ARQ Indicator Channel (PHICH) duration value transmitted from a base station device; and
an acquiring unit that acquires, on the basis of the region size, data sent from the base station device, the base station device updating a Control Format Indicator (CFI) value at a first interval, updating the PHICH duration value at a second interval that is greater than the first interval, and performing scheduling of, only in a subframe in which the PHICH duration value matches the CFI value, the data to be sent to the communication terminal device that is outside an arrival coverage of a signal including the CFI value.

2. A base station device comprising:
a first control unit that updates a Control Format Indicator (CFI) value at a first interval;
a second control unit that updates a Physical Hybrid ARQ Indicator Channel (PHICH) duration value at a second interval, the second interval being greater than the first interval; and
a scheduling unit that performs scheduling of, only in a subframe in which the PHICH duration value matches the CFI value, data to be sent to a communication terminal device that is outside an arrival coverage of a signal including the CFI value.

3. A communication system comprising:
a base station device; and
a communication terminal device that is outside an arrival coverage of a signal including a Control Format Indicator (CFI) value, wherein
the base station device:
  updates the CFI value at a first interval,
  updates a Physical Hybrid ARQ Indicator Channel (PHICH) duration value at a second interval, the second interval being greater than the first interval, and
  performs scheduling of, only in a subframe in which the PHICH duration value matches the CFI value, data to be sent to the communication terminal device, and
the communication terminal device:
  determines a region size of a control channel in accordance with the PHICH duration value transmitted from the base station device, and
  acquires, on the basis of the region size, data to be sent to the communication terminal device.

4. A data acquiring method performed in a communication terminal device, the data acquiring method comprising:
determining a region size of a control channel in accordance with a Physical Hybrid ARQ Indicator Channel (PHICH) duration value transmitted from a base station device; and
acquiring, on the basis of the region size, data sent from the base station device, the base station device updating a Control Format Indicator (CFI) value at a first interval, updating the PHICH duration value at a second interval that is greater than the first interval, and performing scheduling of, only in a subframe in which the PHICH duration value matches the CFI value, the data to be sent to the communication terminal device that is outside an arrival coverage of a signal including the CFI value.

5. A data scheduling method performed in a base station device, the data scheduling method comprising:
updating a Control Format Indicator (CFI) value at a first interval and updating a Physical Hybrid ARQ Indicator Channel (PHICH) duration value at a second interval, the second interval being greater than the first interval; and
performing scheduling of, only in a subframe in which the PHICH duration value matches the CFI value, data to be sent to a communication terminal device that is outside an arrival coverage of a signal including the CFI value.

* * * * *